US012614261B2

(12) United States Patent
Pouli et al.

(10) Patent No.: US 12,614,261 B2
(45) Date of Patent: Apr. 28, 2026

(54) CONVERTING AN IMAGE INTO AN OUTPUT IMAGE HAVING A HIGHER DYNAMIC RANGE

(71) Applicant: FONDATION B-COM, Cesson Sevigne (FR)

(72) Inventors: Foteini Tania Pouli, Le Rheu (FR); Olivier Weppe, Cesson-Sévigné (FR); Jean-Yves Aubié, Melesse (FR)

(73) Assignee: FONDATION B-COM, Cesson Sevigne (FR)

( * ) Notice: Subject to any disclaimer, the term of this patent is extended or adjusted under 35 U.S.C. 154(b) by 314 days.

(21) Appl. No.: 18/258,507

(22) PCT Filed: Dec. 21, 2020

(86) PCT No.: PCT/IB2020/001127
§ 371 (c)(1),
(2) Date: Jun. 20, 2023

(87) PCT Pub. No.: WO2022/136896
PCT Pub. Date: Jun. 30, 2022

(65) Prior Publication Data
US 2024/0046435 A1     Feb. 8, 2024

(51) Int. Cl.
*G06V 10/60* (2022.01)
*G06T 5/92* (2024.01)

(52) U.S. Cl.
CPC ............... *G06T 5/92* (2024.01); *G06V 10/60* (2022.01); *G06T 2207/20208* (2013.01)

(58) Field of Classification Search
CPC ... G06T 5/92; G06T 2207/20208; G06T 5/90; G06T 2207/10024; G06T 2207/20008; G06T 2207/20012; G06V 10/60
See application file for complete search history.

(56) References Cited

U.S. PATENT DOCUMENTS 10,275,865 B2     4/2019  Nam
2015/0103919 A1*  4/2015  Hattori .................. H04N 19/70
                                                375/240.26
(Continued)

FOREIGN PATENT DOCUMENTS

EP        3503019 A1 *  6/2019  ............... G06T 5/50
JP      2015141333 A      8/2015
(Continued)

OTHER PUBLICATIONS

Office Action, issued in Japanese Patent Application No. 2023-537079 dated Jun. 4, 2024.
(Continued)

*Primary Examiner* — Gregory A Morse
*Assistant Examiner* — Renae A Bitor
(74) *Attorney, Agent, or Firm* — NIXON & VANDERHYE

(57)          ABSTRACT

An image processing device and method for converting an input image having a first dynamic range into an output image having a second dynamic range higher than the first dynamic range are provided. The image processing device includes a mapping unit for transforming an input luminance value associated with a pixel of the input image into an output luminance value associated with the corresponding pixel in the output image. The mapping unit is configured to apply a continuous and increasing function mapping a first range of values into a second range of values, whereby the highest value in the first range of values is mapped by the continuous and increasing function into a supremum of the second range of values. The mapping unit is configured to adjust the supremum depending on a peak luminance.

7 Claims, 2 Drawing Sheets

(56) References Cited

U.S. PATENT DOCUMENTS

2015/0213586 A1* 7/2015 Koike ....................... G06T 5/90
                                                      382/284
2016/0328830 A1* 11/2016 Pouli ......................... G06T 5/94
2021/0195139 A1    6/2021 Pouli et al.

FOREIGN PATENT DOCUMENTS

| | | |
|---|---|---|
| JP | 2015144404 A | 8/2015 |
| JP | 2017502602 A | 1/2017 |
| WO | 2015056424 A1 | 4/2015 |
| WO | 2015096955 A1 | 7/2015 |

OTHER PUBLICATIONS

Bist et al., "Tone expansion using lighting style aesthetics", Computers & Graphics, vol. 62, 2017, pp. 77-86.
International Search Report for PCT/IB2020/001127 mailed Sep. 14, 2021, 3 pages.
Written Opinion of the ISA for PCT/IB2020/001127 mailed Sep. 14, 2021, 6 pages.
Erik Reinhard, "Parameter estimation for photographic tone reproduction", Journal graphics tools 7.1, 2002, pp. 45-51.
Bis Cambodge et al, "Tone expansion using lighting style aesthetics", Computers and Graphics, Elsevier, GB, vol. 62, Dec. 15, 2016, pp. 77-86 [Submission Pending].

* cited by examiner

Fig.4
$L_m$
110
$\mu$
112
11
$Y_{peak}$
Fig.5
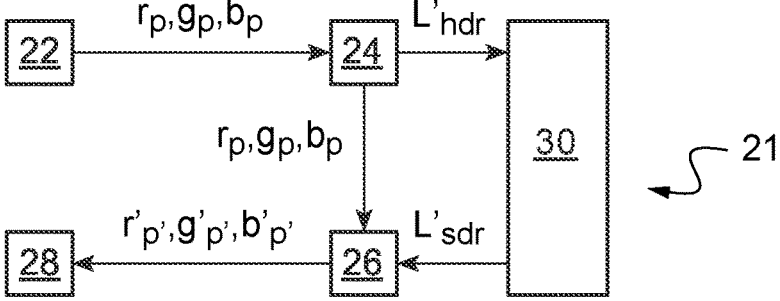
22          $r_p, g_p, b_p$          24          $L'_{hdr}$
30          21
$r_p, g_p, b_p$
28          $r'_{p'}, g'_{p'}, b'_{p'}$          26          $L'_{sdr}$
Fig.6
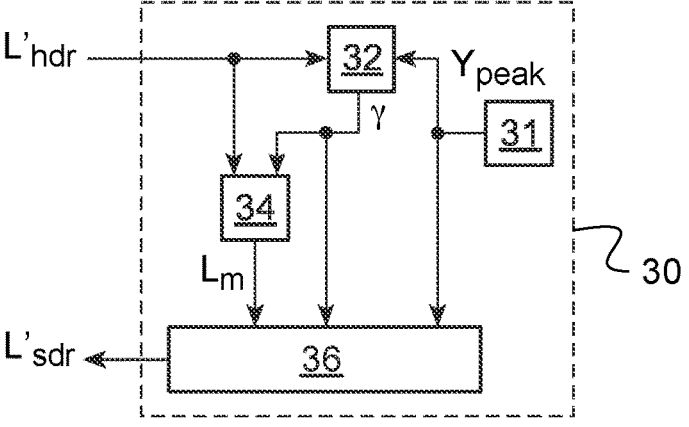
$L'_{hdr}$          32          $Y_{peak}$
$\gamma$
31
34
30
$L_m$
$L'_{sdr}$          36

CONVERTING AN IMAGE INTO AN OUTPUT IMAGE HAVING A HIGHER DYNAMIC RANGE

This application is the U.S. national phase of International Application No. PCT/IB2020/001127, filed Dec. 21, 2020, which designated the U.S. the entire contents of which is hereby incorporated by reference.

TECHNICAL FIELD OF THE INVENTION

The invention relates to the field of image processing.

More particularly, the invention relates to image processing devices and to a method for converting an input image into an output image.

BACKGROUND INFORMATION

Image processing devices have been proposed for converting an input image having a first dynamic range (for instance a "Standard Dynamic Range" or SDR) into an output image having a second dynamic range (for instance a "High Dynamic Range" or HDR) that is higher than the first dynamic range. Such a conversion is generally called "tone expansion".

In such an image processing device, a mapping unit is provided for transforming an input luminance value associated with a pixel of the input image into an output luminance value associated with the corresponding pixel in the output image.

The mapping unit is configured to apply a continuous and increasing function mapping a first range of values into a second range of values, whereby the highest value in the first range of values is mapped by the continuous and increasing function into a supremum of the second range of values.

This function is generally designed to take advantage of the spread of the second dynamic range. Conventionally, the supremum corresponds to the maximum luminance achievable by the HDR display for which the output image is intended.

SUMMARY OF THE INVENTION

In this context, the invention provides an image processing device for converting an input image having a first dynamic range into an output image having a second dynamic range higher than the first dynamic range, the image processing device comprising a mapping unit for transforming an input luminance value associated with a pixel of the input image into an output luminance value associated with the corresponding pixel in the output image, wherein the mapping unit is configured to apply a continuous and increasing function mapping a first range of values into a second range of values, whereby the highest value in the first range of values is mapped by the continuous and increasing function into a supremum of the second range of values, characterised in that the mapping unit is configured to adjust the supremum depending on a peak luminance.

As the supremum is adjustable, the mapping function and the resulting peak luminance may be adapted (either manually or automatically as explained below) depending on the image being processed. In particular, the inventors have realised that mapping the luminance over all the dynamic range available for the output image does not always provide the most pleasing results.

According to a possible embodiment, the mapping unit may comprise a module for determining the peak luminance as a function of pixel values of the input image. The supremum and the mapping function may thus be adjusted automatically, depending on the content of the processed image.

The module for determining the peak luminance is for instance configured to determine the peak luminance based on luminance values respectively associated to pixels of the input image.

According to an embodiment described below, the module for determining the peak value is configured to evaluate a measure of brightness of the input image and to determine the peak luminance as a function (e.g. as a decreasing function) of said measure.

The mapping unit may also be configured to vary at least one parameter of the continuous and increasing function depending on the peak luminance, for instance so that a curvature of the applied continuous and increasing function increases as a function of the peak value.

According to an implementation described below, the mapping unit includes a module for determining an exponent based on the peak luminance and a module for exponentiating using said exponent.

In this implementation, the module for determining the exponent may then be configured so that the exponent increases as a function of the peak luminance.

However, according to a possible variation, another computing module of the mapping unit (e.g. a static mapping module) may perform a processing that is variable depending on the peak luminance.

The mapping unit may include a (computing) module configured to transform the input luminance value into an intermediate luminance value, e.g. by applying a mapping function depending upon the peak luminance. The exponentiating module mentioned above may be applied to this intermediate luminance value (i.e. the exponentiating module exponentiates the intermediate luminance value using the exponent mentioned above).

The invention also provides a method for converting an input image having a first dynamic range into an output image having a second dynamic range higher than the first dynamic range, including a step of transforming an input luminance value associated with a pixel of the input image into an output luminance value associated with the corresponding pixel in the output image, wherein the transforming step includes a sub-step of applying a continuous and increasing function mapping a first range of values into a second range of values, whereby the highest value in the first range of values is mapped by the continuous and increasing function into a supremum of the second range of values, characterised in that the supremum is adjustable depending on a peak luminance.

Such a method may further include a step of determining the peak luminance as a function of pixel values of the input image.

This step of determining the peak luminance may in turn include a sub-step of evaluating a measure of brightness of the input image and/or a sub-step of determining the peak luminance as a function of said measure.

As noted above, a parameter of the continuous and increasing function may be variable depending on the peak luminance.

Lastly, the invention provides an image processing device for converting an input image having a first dynamic range into an output image having a second dynamic range lower than the first dynamic range, the image processing device comprising a mapping unit for transforming an input luminance value associated with a pixel of the input image into an output luminance value associated with the corresponding pixel in the output image, wherein the mapping unit is configured to apply a continuous and increasing function mapping a first range of values into a second range of values, whereby a supremum of the first range of values is mapped by the continuous and increasing function into the highest value in the second range of values, characterised in that the mapping unit is configured so that the supremum is adjustable depending on a peak luminance.

Other possible features for these devices and method will appear from the description of possible embodiments of the invention given below.

DETAILED DESCRIPTION OF EXAMPLES

The following description with reference to the accompanying drawings will make it clear what the invention consists of and how it can be achieved. The invention is not limited to the embodiments illustrated in the drawings. Accordingly, it should be understood that, where features mentioned in the claims are followed by reference signs, such signs are included solely for the purpose of enhancing the intelligibility of the claims and are in no way limiting on the scope of the claims.

In the accompanying drawings:

FIG. 4 shows a possible embodiment for a peak luminance provision module that can be used in the mapping unit of FIG. 2;

FIG. 5 shows an example of an image processing device according to another aspect of the invention, and that can be used in correlation with the image processing device of FIG. 1; and FIG. 6 shows a possible embodiment of a mapping unit that can be used in the image processing device of FIG. 5.

This image processing device 1 may be implemented in practice by an electronic device including a processor and a memory storing program code instructions adapted to perform the operation and functions of the modules and units described below, when the concerned program code instructions are executed by the processor.

As it will be apparent from the following description, the image processing device 1 is designed to convert an input image $I_{sdr}$ having a first dynamic range $\Delta_{sdr}$ (for instance a standard dynamic range or SDR) into an output image $I_{hdr}$ having a second dynamic range $\Delta_{hdr}$ (for instance a high dynamic range or HDR), the second dynamic range $\Delta_{hdr}$ being (strictly) higher than the first dynamic range $\Delta_{sdr}$.

Such a process of converting an input image $I_{sdr}$ having a first dynamic range $\Delta_{sdr}$ into an output image $I_{hdr}$ having a second dynamic range $\Delta_{hdr}$ higher than the first dynamic range $\Delta_{sdr}$ is generally referred to as "tone expansion".

The input image $I_{sdr}$ is represented, using a set of pixels (generally a matrix of pixels) of the input image $I_{sdr}$, by a plurality of component values $R_p$, $G_p$, $B_p$ for each pixel p.

In the present example, the input image $I_{sdr}$ is represented by three colour components $R_p$, $G_p$, $B_p$ for each pixel p (namely a red component $R_p$, a green component $G_p$ and a blue component $B_p$). Another representation may however be used for the input image $I_{sdr}$, such as for instance using a luminance component $Y_p$ and two chrominance components $U_p$, $V_p$ for each pixel p.

Figure 1:
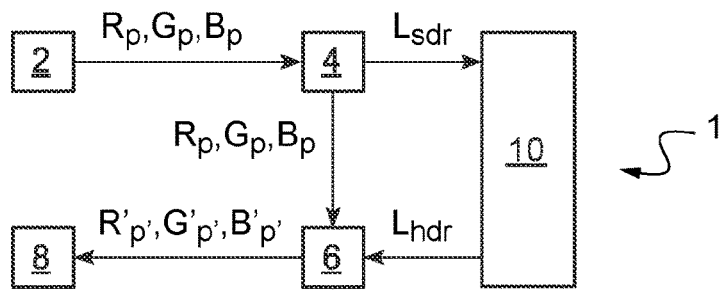
FIG. 1 shows an example of an image processing device according to the invention.

As visible in FIG. 1, the image processing device 1 includes an input module 2 for receiving the input image $I_{sdr}$, i.e. the component values $R_p$, $G_p$, $B_p$ representing the input image $I_{sdr}$. In practice, the component values $R_p$, $G_p$, $B_p$ representing the input image $I_{sdr}$ may be received from another module of the electronic device or from an external electronic device (through a communication circuit cooperating with the input module 2).

The image processing device 1 also includes an image preparation module 4 configured to produce (for each pixel p) an input luminance value $L_{sdr}$ based on the component values $R_p$, $G_p$, $B_p$ (of the concerned pixel p).

The image preparation module 4 may implement several steps for producing the input luminance value $L_{sdr}$ based on the component values $R_p$, $G_p$, $B_p$, for instance in the present case:

- application of an inverse Opto-Electrical Transfer Function (or $OETF^{-1}$);
- conversion from ITU-R BT.709 standard representation to ITU-R BT.2020 standard representation;
- luminance computation from the ITU-R BT.2020 standard representation.

Thanks to the step of application of the inverse Opto-Electrical Transfer Function, the input luminance value $L_{sdr}$ produced by the image preparation module 4 represents a linear luminance component of the input image $I_{sdr}$.

The image processing device 1 includes a mapping unit 10 designed (as further explained below) to transform the input luminance value $L_{sdr}$ associated with any pixel p of the input image $I_{sdr}$ into an output luminance value $L_{hdr}$ associated with the corresponding pixel p' in the output image $I_{hdr}$.

As described below, the mapping unit 10 is configured to apply a continuous and increasing function $f_{Y_{peak}}$ mapping a first range of values $[x_0, x_1]$ into a second range of values $[y_0, y_1]$, whereby the highest value $x_1$ in the first range of values is mapped by the continuous and increasing function $f_{Y_{peak}}$ into the supremum $y_1$ of the second range of values. The supremum $y_1$ is adjustable depending on (and in correlation with) a peak luminance $Y_{peak}$ which can be either selected by the user of the image processing device 1 or determined based on the content of the input image $I_{sdr}$.

The function $f_{Y_{peak}}$ being an increasing function means that, for any pair $(z_1, z_2)$ in the first range of values $[x_0, x_1]$ such that $z_1 \le z_2$, $f_{Y_{peak}}(z_1) \le f_{Y_{peak}}(z_2)$.

As further explained below, the continuous and increasing function $f_{Y_{peak}}$ used varies depending on the adjustable peak value $Y_{peak}$, hence the notation $f_{Y_{peak}}$.

The continuous and increasing function $f_{Y_{peak}}$ is for instance convex over the first range of values. (The continuous and increasing function $f_{Y_{peak}}$ may in particular be convex when the peak luminance $Y_{peak}$ equals the maximum luminance $Y_{max}$ mentioned below.) Such a function makes it possible to provide a broader tone expansion in the highlights (than for shadows and midtones) and to take advantage of the (broader) second dynamic range $\Delta_{hdr}$. This effect is however attenuated for lower values of the peak luminance $Y_{peak}$, as explained below.

In the present case, the continuous and increasing function $f_{Y_{peak}}$ maps each input luminance value $L_{sdr}$ (included in the first range of values $[x_0, x_1]$ and relating to a particular pixel p) into the output luminance value $L_{hdr}$ (included in the second range of values $[y_0, y_1]$ and relating to the corresponding pixel p' in the output image $I_{hdr}$).

In the present case, input luminance values $L_{sdr}$ are normalised (i.e. represent a ratio to the maximum possible input luminance value); thus, $x_0=0$ and $x_1=1$.

A possible embodiment of the mapping unit 10 is described below referring to FIG. 2.

The image processing device 1 includes an image production module 6 configured to determine, for each pixel p' of the output image $I_{hdr}$, component values $R'_{p'}$, $G'_{p'}$, $B'_{p'}$ for the concerned pixel p' based on the output luminance value $L_{hdr}$ produced by the mapping unit 10 for the concerned pixel p' and on the component values $R_p$, $G_p$, $B_p$ relating to the corresponding pixel p in the input image $I_{sdr}$.

To determine component values $R'_{p'}$, $G'_{p'}$, $B'_{p'}$ based on the output luminance value $L_{hdr}$ and the component values $R_p$, $G_p$, $B_p$, the image production module 6 implements for instance:

- a step of scaling the component values $R_p$, $G_p$, $B_p$ using the output luminance value $L_{hdr}$ (so that the scaled component values represent a colour having the output luminance value $L_{hdr}$);
- a possible step of colour correction (e.g. by saturation adjustment);
- a possible step of application of an Opto-Electrical Transfer Function (or OETF).

In the present example, the component values $R'_{p'}$, $G'_{p'}$, $B'_{p'}$ are three colour components $R'_{p'}$, $G'_{p'}$, $B'_{p'}$ for each pixel p' of the output image $I_{hdr}$ (namely a red component $R'_{p'}$, a green component $G'_{p'}$, and a blue component $B'_{p'}$). Another representation may however be used for the output image $I_{hdr}$, such as for instance using a luminance component $Y'_{p'}$, (possibly equal in this case to the output luminance value $L_{hdr}$ produced by the mapping unit 10 for the concerned pixel p') and two chrominance components $U'_{p'}$, $V'_{p'}$, for each pixel p'.

The image processing device 1 includes an output module 8 for outputting the component values $R'_{p'}$, $G'_{p'}$, $B'_{p'}$, for instance for use by a display module of the electronic device mentioned above to display the output image $I_{hdr}$ on a screen of this electronic device, or, as a variation, for transmission to an external electronic device (using a communication circuit of the electronic device).

Said differently, the electronic device implementing the image processing device 1 may be a display device including a screen suitable for displaying the output image $I_{hdr}$. As a variation however, the electronic device may be a processing device with no display, possibly with a communication circuit for transmitting the component values $R'_{p'}$, $G'_{p'}$, $B'_{p'}$ representing the output image $I_{hdr}$ to an external electronic device (that may include a screen suitable for displaying the output image $I_{hdr}$).

Figure 2:
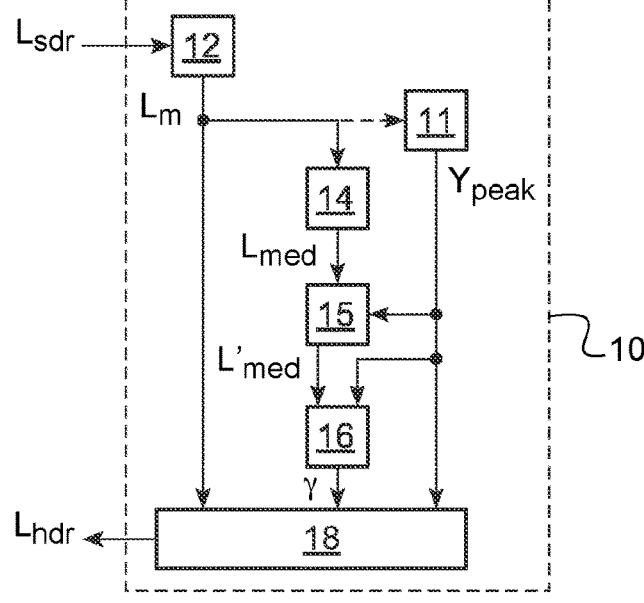
FIG. 2 shows a possible embodiment of a mapping unit that can be used in the image processing device of FIG. 1.

FIG. 2 shows a possible embodiment of the mapping unit 10.

The mapping unit 10 includes a peak luminance provision module 11, a static mapping module 12, a central tendency evaluation module 14, a central tendency correction module 15, an exponent determination module 16 and an adaptive mapping module 18.

The peak luminance provision module 11 is configured to provide a peak luminance $Y_{peak}$ This peak luminance $Y_{peak}$ is adjustable between a first predetermined value $Y_{min}$ and a second predetermined value $Y_{max}$.

The (second) predetermined value $Y_{max}$ is thus the maximum allowable value for the adjustable peak luminance $Y_{peak}$, which may correspond for instance to the maximum luminance obtainable by the display on which the output image $I_{hdr}$ is to be displayed. For current HDR displays, use is made of a maximum luminance $Y_{max}$ equal to 1000 nits (i.e. 1000 cd/m$^2$).

As the peak luminance $Y_{peak}$ is adjustable, it may of course be different from the maximum allowable or obtainable luminance $Y_{max}$.

The first predetermined value $Y_{min}$ (corresponding to the minimum allowable value for the image processing device concerned) may be the null value (0 cd/m$^2$) or a relatively low value (for instance between 100 cd/m$^2$ and 400 cd/m$^2$, here 200 cd/m$^2$).

In a first embodiment, the peak luminance provision module 11 is configured to receive (as an input for the mapping unit 10) the peak luminance $Y_{peak}$. The peak luminance $Y_{peak}$ is for instance selected by a user of the image processing device 1. The peak luminance $Y_{peak}$ may be entered by the user via a user interface of the above-mentioned electronic device, for instance; the user interface then transmits the entered peak luminance $Y_{peak}$ to the mapping unit 10 (via the peak luminance provision module 11). According to another possibility, the peak luminance $Y_{peak}$ may be stored in a storage unit of the image processing device 1; the peak luminance provision module 11 may then read the peak luminance $Y_{peak}$ from the storage unit.

In a second embodiment, the peak luminance provision module 11 is configured to determine the peak value $Y_{peak}$ as a function of the content (i.e. here pixel values) of the input image $I_{sdr}$, for instance based on luminance values respectively associated to pixels p of the input image $I_{sdr}$.

An exemplary embodiment of such a peak luminance provision module 11 is described below with reference to FIG. 4.

The static mapping module 12 transforms (for each pixel p) the input luminance value $L_{sdr}$ into an intermediate luminance value $L_m$.

In the present case, the intermediate luminance value $L_m$ is obtained from the input luminance value $L_{sdr}$ by applying a function h which depends neither on the image content (i.e. neither on the pixel values of the input image $I_{sdr}$) nor on the peak luminance $Y_{peak}$ (this mapping thus being considered as "static"): $L_m=h(L_{sdr})$. The function h may however be specifically adapted to other conditions, for instance depending on the type of display on which the output image Ihdr is intended to be displayed.

In the example presently described, the static mapping module 12 is configured to obtain the intermediate luminance value $L_m$ as follows:

$$L_m = \frac{m_b * L_{sdr}^{m_c^{-1}}}{m_a - L_{sdr}^{m_c^{-1}}}$$

with $m_a = 1.5284$, $m_b = 0.5279$ and $m_c = 0.7997$.

The central tendency evaluation module 14 is configured to evaluate a measure $L_{med}$ of central tendency (over the currently processed image) of the intermediate luminance values $L_m$ produced by the static mapping module 12. This measure of central tendency $L_{med}$ is thus determined based on the intermediate luminance values $L_m$ respectively associated with all the pixels of the processed image (i.e. produced by the static mapping module 12 based respectively on the input luminance values $L_{sdr}$ of all the pixels of the input image $I_{sdr}$).

In the present example, the measure of central tendency $L_{med}$ is the median among the intermediate luminance values $L_m$ over all the pixels of the processed image.

The central tendency correction module 15 is configured to correct the measure of central tendency $L_{med}$ produced by the central tendency evaluation module 14, in particular based on the peak luminance $Y_{peak}$, so as to obtain a corrected measure of central tendency $L'_{med}$.

Precisely here, the central tendency correction module 15 is configured to scale down the measure of central tendency $L_{med}$ based on the peak luminance $Y_{peak}$ to obtain the corrected measure of central tendency $L'_{med}$.

In addition, in the present example, the central tendency correction module 15 is also configured not to produce a corrected measure of central tendency $L'_{med}$ equal to zero (in order to avoid an error when determining the exponent as described below), for instance by replacing the scaled-down measure of central tendency by a predetermined (infinitesimal) value $L_0$ if this scaled-down measure of central tendency is below this predetermined value $L_0$.

Thus, in the present example, the central tendency correction module 15 determines the corrected measure of central tendency $L'_{med}$ as follows:

$$L'_{med} = \max(L_{med} * Y_{peak}/Y_{max}, L_0),$$

where $\max(I, I')$ is the operator producing the maximum value between values I and I'.

The exponent determination module 16 is configured to determine an exponent $\gamma$ based on the peak luminance value $Y_{peak}$ and a measure of central tendency of the luminance of the processed image, here the corrected measure of central tendency $L'_{med}$ produced by the central tendency correction module 15.

In the present embodiment, the exponent determination module 16 is configured so that, for a given (here corrected) measure of central tendency $L'_{med}$, the determined exponent $\gamma$ increases as a function of the peak value $Y_{peak}$.

In the example presently described, the exponent determination module 16 is configured to determine the exponent $\gamma$ as follows:

$$\gamma = \frac{1}{g * \log_{10}(L'_{med}) + o} + \delta$$

with g a gain parameter (e.g. g=0.06), o an offset (e.g. o32 1), $$\delta = 1 - \left(\frac{Y_{max}}{Y_{peak}}\right)^{0.13}.$$

Thus, in the present example, the exponent is the sum of a first term and a second term $\delta$, where the first term decreases as a function of the (here corrected) measure $L'_{med}$ of central tendency of luminance of the input image $I_{sdr}$ and/or the second term $\delta$ increases as a function of the peak luminance $Y_{peak}$. It may be noted that, here, the second term $\delta$ does not vary as a function of the (corrected) measure of central tendency $L'_{med}$. In the present case, the second term $\delta$ is a non-positive number and/or is equal to zero when the peak luminance $Y_{peak}$ equals the maximum luminance $Y_{max}$.

The adaptive mapping module 18 is configured to produce the output luminance value $L_{hdr}$ (for each pixel p' of the output image $I_{hdr}$) based on the intermediate luminance value $L_m$ (for the corresponding pixel p), the peak value $Y_{peak}$ and the exponent $\gamma$.

In the present case, the adaptive mapping module 18 is more precisely configured to exponentiate, using the exponent $\gamma$, a value derived from the intermediate luminance value $L_m$, here a value proportional to the intermediate luminance value $L_m$.

The adaptive mapping module 18 is here designed such that the produced output luminance value $L_{hdr}$ is in the second range of values [$y_0$, $y_1$], i.e. in particular below (or equal to) the supremum $y_1$, which depends on the peak luminance $Y_{peak}$. The supremum $y_1$ is for instance proportional to the peak luminance $Y_{peak}$. In the present case, the supremum $y_1$ is equal to the ratio between the peak luminance $Y_{peak}$ and the maximum luminance $Y_{max}$: $y_1 = Y_{peak}/Y_{max}$.

In the example described here, the adaptive mapping module 18 is configured to determine the output luminance value $L_{hdr}$ as follows:

$$L_{hdr} = \left(\frac{Y_{peak}}{Y_{max}}\right) * \left(L_m * \frac{m_a - 1}{m_b}\right)^{\gamma}$$

In practice, this could be implemented by first multiplying the intermediate luminance value $L_m$ by a coefficient $m_{scale}$ $$\left(\text{with } m_{scale} = \left(\frac{Y_{peak}}{Y_{max}}\right)^{\frac{1}{\gamma}} * \frac{m_a - 1}{m_b}\right),$$

and then exponentiating the resulting (multiplied) value using the exponent $\gamma$.

According to a possible variation, the adaptive mapping module 18 may be adapted to exponentiate, using the exponent $\gamma$, a value derived from the intermediate value $L_m$ as just described, but a specific module could be used in addition to scale (e.g. scale down) the exponentiated value so that the produced output luminance value $L_{hdr}$ is in the second range of values [$y_0$, $y_1$], i.e. in particular below (or equal to) the supremum $y_1$, which depends on the peak luminance $Y_{peak}$.

Figure 3:
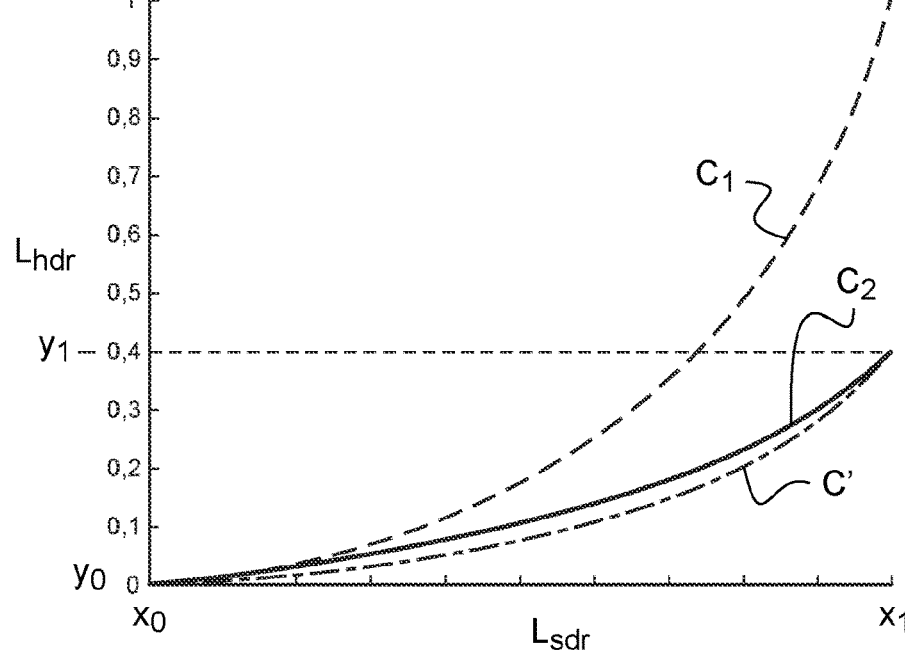
FIG. 3 shows curves representing examples of continuous and increasing functions used by the mapping unit of FIG. 2.

FIG. 3 shows curves representing examples of continuous and increasing functions used by the mapping unit 10.

Curve $C_1$ (shown in dashed line) represents the continuous and increasing function $f_{Y_{max}}$ used by the mapping unit 10 when $Y_{peak} = Y_{max}$ (i.e. here $Y_{peak} = 1000$ cd/m²).

Curve C2 (shown in solid line) represents the continuous and increasing function $f_{Y_{peak}}$ used by the mapping unit 10 when $Y_{peak} = 0.4$. $Y_{max}$ (i.e. here $Y_{peak} = 400$ cd/m²).

To ease comparison, curve C' (shown in chain dotted line) is a curve having the same shape (or curvature) as the curve $C_1$, but with a supremum equal to the supremum of the curve $C_2$. (Said differently, curve C' represents the function $0.4.f_{Y_{max}}$.)

Thus, as clear from FIG. 3, it is proposed here that adjusting the peak luminance not only scales down proportionally the continuous and increasing function used by the mapping unit 10, but also changes the shape of the curve representing this continuous and increasing function, i.e. the way the luminance is spread over the second range of values [$y_0$, $y_1$] (which supremum $y_1$ varies depending on the peak luminance $Y_{peak}$).

Said differently, for 2 peak luminance values $Y'_{peak}$, $Y''_{peak}$ distinct from each other, the curve representing the (continuous and increasing) function $f_{Y'_{peak}}$ (used for the peak luminance is $Y'_{peak}$) not (merely) the image of the curve representing the (continuous and increasing) function $f_{Y''_{peak}}$ (used for the peak luminance $Y''_{peak}$) by a stretching or shrinking transformation along the y-axis (corresponding to output luminance values $L_{hdr}$), i.e. perpendicular to the x-axis (corresponding to input luminance values $L_{sdr}$). This means that the functions $f_{Y'_{peak}}$ and $f_{Y''_{peak}}$ just defined are not proportional to each other.

Thus, for a given value x taken in the first range $[x_0, x_1]$ and distinct from the highest value $x_1$ (for instance $x=x_0+0.5.[x_1-x_0]$), the ratio between the gradient $f'_{Y_{peak}}(x)$ of the function $f_{Y_{peak}}$ at x and the gradient $f'_{Y_{peak}}(x_1)$ of the function $f_{Y_{peak}}$ for the highest value $x_1$ varies depending on $Y_{peak}$. ($f'_{Y_{peak}}$ corresponds to the derivative of the function $f_{Y_{peak}}$ and therefore gives the gradient of the function $f_{Y_{peak}}$ or slope of the curve representing the function $f_{Y_{peak}}$.)

For 2 peak luminance values $Y'_{peak}$, $Y''_{peak}$ distinct from each other, the function $f_{Y'_{peak}}$ used for the peak luminance $Y'_{peak}$ and the function $f_{Y''_{peak}}$ used for the peak luminance $Y''_{peak}$ are in this case such that the ratio $f'_{Y'_{peak}}(x)/f'_{Y'_{peak}}(x_1)$ (between the gradient of the function $f_{Y'_{peak}}$ at x and the gradient of the function $f_{Y'_{peak}}$ at the highest value $x_1$) is different from the ratio $f'_{Y''_{peak}}(x)/f'_{Y''_{peak}}(x_1)$ (between the gradient of the function $f_{Y''_{peak}}$ at x and the gradient of the function $f_{Y''_{peak}}$ at the highest value $x_1$).

Also, for a given value x taken in the first range $[x_0, x_1]$ and distinct from the highest value $x_1$ (for instance $x=x_0+0.5.[x_1-x_0]$), the relative distance to linear mapping depends on the peak luminance $Y_{peak}$. Linear mapping would map the input value x to $y_0+(y_1-y_0)(x-x_0)/(x_1-x_0)$ and the relative distance to linear mapping is thus:

$|y_0+(y_1-y_0)(x-x_0)/(x_1-x_0)-f_{Y_{peak}}(x)|/(y_1-y_0)$, where $|z|$ is the absolute value (or modulus) of z.

Said differently, for 2 peak luminance values $Y'_{peak}$, $Y''_{peak}$ distinct from each other, noting $f_{Y'_{peak}}$ the function and $y'_1$ the supremum used for the peak luminance $Y'_{peak}$ and $f_{Y''_{peak}}$ the function and $y''_1$ the supremum used for the peak luminance $Y''_{peak}$, the relative distance to linear mapping d' when the peak luminance $Y'_{peak}$ is used is distinct from the relative distance to linear mapping d" when the peak luminance $Y''_{peak}$ is used, with:

$$d'=|y_0+(y'_1-y_0)(x-x_0)/(x_1-x_0)-f_{Y'_{peak}}(x)|/(y'_1-y_0)$$

$$d''=|y_0+(y''_1-y_0)(x-x_0)/(x_1-x_0)-f_{Y'_{peak}}(x)|/(y''_1-y_0).$$

In the present case where $x_0=y_0=0$, $y'_1=Y'_{peak}/Y_{max}$ and $y''_1=Y''_{peak}/Y_{max}$, this means that for any value x taken in the first range $[x_0, x_1]$ and distinct from the highest value $x_1$ (for instance $x=x_0+0.5.[x_1-x_0]$): $[x/x_1-Y_{max}.f_{Y'_{peak}}(x)/Y'_{peak}]$ is different from $[x/x_1-Y_{max}.f_{Y''_{peak}}(x)/Y''_{peak}]$. (This comes from the fact that, as explained above, the functions $f_{Y'_{peak}}$ and $f_{Y''_{peak}}$ are not proportional to each other.)

The relative distance to linear mapping (defined above for a value x taken in the first range $[x_0, x_1]$ and distinct from the highest value $x_1$, e.g. for $x=x_0+0.5.[x_1-x_0]$) may for instance increase as a function of the peak luminance $Y_{peak}$.

It may be provided for instance that a curvature of the applied continuous and increasing function increases as a function of the peak value.

Changing the shape of the curve depending on the peak value $Y_{peak}$ makes it possible to expand highlights a lot when a broad dynamic range is available (i.e. when the peak luminance $Y_{peak}$ is high) and to avoid crushing midtones and shadows too much towards blacks when the peak luminance $Y_{peak}$ is low, as would result for instance if using a mere scaling-down of the curve $C_1$ as the curve C'.

In the embodiment of the mapping unit 10 described above, this results from the variation (here the increase) of the exponent γ as a function of the peak value $Y_{peak}$. In other embodiments however, the change of the shape of the curve representing the continuous and increasing function depending on the peak luminance $Y_{peak}$ could be obtained by varying another parameter of the continuous and increasing function depending on the peak luminance $Y_{peak}$, for instance by modifying the effect of the static mapping module 12 depending on the peak luminance $Y_{peak}$.

This modification of the effect of the static mapping module 12 depending on the peak luminance $Y_{peak}$ could be implemented as an alternative to the variation of the exponent γ as a function of the peak luminance $Y_{peak}$, or in addition to the variation of the exponent γ as a function of the peak luminance $Y_{peak}$.

In a possible embodiment, the exponent γ is determined as a function of the peak luminance $Y_{peak}$ (for instance using the exponent determination module 16 described above) and/or the intermediate luminance value $L_m$ is obtained from the input luminance value $L_{sdr}$ by applying a function $\lambda_{Y_{peak}}$ having $Y_{peak}$ as a parameter:

$$L_m=\lambda_{Y_{peak}}(L_{sdr})$$

In addition, the function $\Delta_{Y_{peak}}$ is for instance such that $\Delta_{Y_{min}}(L_{sdr})=L_{sdr}$ for any $L_{sdr}$ in first range of values $[x_0, x_1]$ (i.e. the function $\Delta_{Y_{min}}$ is the identity function).

The function $\Delta_{Y_{peak}}$ is for instance a $n^{th}$ order polynomial:

$$\lambda_{Y_{peak}}(x)=m_0.x^n+m_1.x^{n-1}+ \ldots \, m_{n-1}.x+m_n$$

where parameters $m_0, m_1, \ldots, m_n$ are chosen such that $\lambda_{Y_{min}}(L_{sdr})=L_{sdr}$. In this goal, at least some of the parameters $m_i$ depend on $Y_{peak}$ and $m_i(Y_{min})=0$ for i different from 1 and $m_1(Y_{min})=1$.

Other types of function could however be used, such as a spline-based function.

Together with an exponent γ decreasing (e.g. tending to 1) when the peak luminance $Y_{peak}$ decreases near $Y_{min}$, this makes possible to converge to a linear scaling (i.e. $L_{hdr}=(Y_{peak}/Y_{max}).L_{sdr}$) for $Y_{peak}=Y_{min}$.

FIG. 4 shows a possible embodiment for the peak luminance provision module 11 used in the mapping unit 10.

In this embodiment, the peak luminance provision module 11 comprises a brightness estimation module 110 and a peak luminance determination module 112.

The brightness estimation module 110 is configured to evaluate a measure μ of brightness of the input image $I_{sdr}$, derived here from input luminance values $L_{sdr}$ of the pixels p of the input image $I_{sdr}$.

Precisely, in the present example, the measure of brightness μ is computed from the intermediate luminance values $L_m$ produced by the static mapping module 12 (based on input luminance values $L_{sdr}$ as explained above).

According to a first possibility, the measure of brightness μ is a predetermined percentile (e.g. a predetermined percentile equal to or above the $60^{th}$ percentile) of luminance values (i.e. here among the intermediate luminance values $L_m$). In the present example, the measure of brightness μ is the $80^{th}$ percentile of the luminance values (here of the intermediate luminance values $L_m$).

Said differently, in this case, the measure of brightness μ is the (here intermediate) luminance value for which a predetermined percentage (here 80%) of the pixels of the image has a luminance (here an intermediate luminance $L_m$) below this luminance value.

According to a second possibility, the measure of brightness μ is a weighted median $m_w$ of the luminance values (here of the intermediate luminance values $L_m$). This weighted median $m_w$ is computed while attributing larger weights to bright pixels, for instance as now explained.

It is proposed here to define N bins over the possible luminance values (here the possible intermediate luminance values), a given bin $i \in \{1, \ldots, N\}$ corresponding to pixels having a luminance value between V(i) and V(i+1) and H(i) being the count of these pixels having a luminance value between V(i) and V(i+1) (V(1) thus corresponding to the least possible luminance value, V(N+1) corresponding to the largest possible luminance value, and for any $j \in \{1, \ldots, N\}$, V(j)<V(j+1)).

A weight W(i) is attributed to each bin i as follows:

$$W(i) = (1 - w_{off}) * \left(\frac{i-1}{N}\right)^{w_s} + w_{off}$$

where $w_{off}$ and $w_s$ are parameters than can be adjusted; in the present example, $w_{off}$=0.3 and $w_s$=2.

The brightness estimation module 110 can thus produce a cumulative weighted histogram C as follows:

$$C(i) = \sum_{j=1}^{i} H(j) * W(j)$$

for any $i \in \{1, \ldots, N\}$, and then a normalized cumulative histogram C':

$$C'(i) = \frac{C(i)}{C(N)}$$

for any $i \in \{1, \ldots, N\}$, which represents a weighted cumulative distribution function of the image luminance.

The brightness estimation module 110 can thus determine the weighted median $m_w$ as the luminance value V(k), where k is the first (i.e. lowest) element in $\{1, \ldots, N\}$ for which C'(k)≥0,5.

The peak luminance determination module 112 is configured to determine the peak luminance $Y_{peak}$ based on the measure of brightness $\mu$ produced by the brightness estimation module 110.

It is proposed here that the peak luminance $Y_{peak}$ decreases as a function of the measure of brightness $\mu$. This makes it possible to increase viewing comfort and/or to improve power consumption. Brighter images will lead to a higher measure of brightness and will therefore be mapped to a lower peak luminance $Y_{peak}$, ensuring that the average brightness of the resulting image does not become uncomfortably high.

In the example described here, the peak luminance determination module 112 is configured to compute the peak luminance $Y_{peak}$ as follows:

$$Y_{peak} = \left(Y_{max} - (Y_{max} - Y_{min}) * \left(\left(\frac{1}{1-\tau}\right) * (\mu - \tau)\right)^2\right) \text{ for } \mu \geq \tau$$

$$Y_{peak} = Y_{max} \text{ for } \mu < \tau$$

where $\tau$ is the threshold in terms of measure of brightness $\mu$ beyond which the peak luminance determination module 112 causes a reduction of the peak luminance $Y_{peak}$ as a function of the measure of brightness $\mu$.

FIG. 5 shows an example of an image processing device 21 according to another aspect of the invention.

As it will be apparent from the following description, the image processing device 21 is designed to convert an input image $I'_{hdr}$ having a first dynamic range $\Delta_{hdr}$ (for instance a high dynamic range or HDR) into an output image $I'_{sdr}$ having a second dynamic range $\Delta_{sdr}$ (for instance a standard dynamic range or SDR), the second dynamic range $\Delta_{sdr}$ being (strictly) lower than the first dynamic range $\Delta_{hdr}$.

Such a process of converting an input image $I'_{hdr}$ having a first dynamic range $\Delta_{hdr}$ into an output image $I'_{sdr}$ having a second dynamic range $\Delta_{sdr}$ lower than the first dynamic range $\Delta_{hdr}$ is generally referred to as "tone compression".

The image processing device 21 may for instance be used to process images produced by an image processing device 1 as described above with reference to FIG. 1, in particular to make it possible to obtain back the initial input image $I_{sdr}$ (a process generally called "roundtrip").

The image processing device 21 may be implemented in practice by an electronic device including a processor and a memory storing program code instructions adapted to perform the operation and functions of the modules and units described below, when the concerned program code instructions are executed by the processor.

The input image $I'_{hdr}$ is represented, using a set of pixels (generally a matrix of pixels) of the input image $I'_{hdr}$, by a plurality of component values $r_p$, $g_p$, $b_p$ for each pixel p.

In the present example, the input image $I'_{hdr}$ is represented by three colour components $r_p$, $g_p$, $b_p$ for each pixel p (namely a red component $r_p$, a green component $g_p$ and a blue component $b_p$). Another representation may however be used for the input image $I'_{hdr}$, such as for instance using a luminance component $y_p$ and two chrominance components $u_p$, $v_p$ for each pixel p.

As visible in FIG. 5, the image processing device 21 includes an input module 22 for receiving the input image $I'_{hdr}$, i.e. the component values $r_p$, $g_p$, $b_p$ representing the input image $I'_{hdr}$. In practice, the component values $r_p$, $g_p$, $b_p$ representing the input image $I'_{hdr}$ may be received from another module of the electronic device or from an external electronic device (through a communication circuit cooperating with the input module 22).

The image processing device 21 also includes an image preparation module 24 configured to produce (for each pixel p) an input luminance value $L'_{hdr}$ based on the component values $r_p$, $g_p$, $b_p$ (of the concerned pixel p).

The image preparation module 24 may implement several steps for producing the input luminance value $L'_{hdr}$ based on the component values $r_p$, $g_p$, $b_p$, for instance in the present case:

application of an inverse Opto-Electrical Transfer Function (or OETF$^{-1}$);

luminance computation from the RGB representation.

Thanks to the step of application of the inverse Opto-Electrical Transfer Function, the input luminance value $L'_{hdr}$ produced by the image preparation module 24 represents a linear luminance component of the input image $I'_{hdr}$.

The image processing device 21 includes a mapping unit 30 designed (as further explained below) to transform the input luminance value $L'_{hdr}$ associated with any pixel p of the input image $I'_{hdr}$ into an output luminance value $L'_{sdr}$ associated with the corresponding pixel p' in the output image $I'_{sdr}$.

As described below, the mapping unit 30 is configured to apply a continuous and increasing function $\varphi_{Y_{peak}}$ mapping a first range of values [$y_0$, $y_1$] into a second range of values [$x_0$, $x_1$], whereby the supremum $y_1$ of the first range of values is mapped by the continuous and increasing function $\varphi_{Y_{peak}}$ into the highest value $x_1$ in the second range of values. The supremum $y_1$ is adjustable depending on (and in correlation with) a peak luminance $Y_{peak}$ which can be either selected by the user of the image processing device 21 or received as metadata associated with the input image $I'_{hdr}$, for instance.

The function $\varphi_{Y_{peak}}$ being an increasing function means that, for any pair ($z_1$, $z_2$) in the first range of values [$y_0$, $y_1$] such that $z_1 \leq z_2$, $\varphi_{Y_{peak}}(z_1) \leq \varphi_{Y_{peak}}(z_2)$.

As further explained below, the continuous and increasing function $\varphi_{Y_{peak}}$ used varies depending on the adjustable peak value $Y_{peak}$, hence the notation $\varphi_{Y_{peak}}$.

In the present case, the continuous and increasing function $\varphi_{Y_{peak}}$ maps each input luminance value $L'_{hdr}$ (included in the first range of values [$y_0$, $y_1$] and relating to a particular pixel p) into the output luminance value $L'_{sdr}$ (included in the second range of values [$x_0$, $x_1$] and relating to the corresponding pixel p' in the output image $I'_{sdr}$).

A possible embodiment of the mapping unit 30 is described below referring to FIG. 6.

The image processing device 21 includes an image production module 26 configured to determine, for each pixel p' of the output image $I'_{sdr}$, component values $r'_{p'}$, $g'_{p'}$, $b'_{p'}$ for the concerned pixel p' based on the output luminance value $L'_{sdr}$ produced by the mapping unit 30 for the concerned pixel p' and on the component values $r_p$, $g_p$, $b_p$ relating to the corresponding pixel p in the input image $I'_{hdr}$.

To determine component values $r'_{p'}$, $g'_{p'}$, $b'_{p'}$ based on the output luminance value $L'_{sdr}$ and the component values $r_p$, $g_p$, $b_p$, the image production module 26 implements for instance:

- a step of scaling the component values $r_p$, $g_p$, $b_p$ using the output luminance value $L'_{sdr}$ (so that the scaled component values represent a colour having the output luminance value $L'_{sdr}$);
- a possible step of colour correction (e.g. by saturation adjustment);
- a possible step of conversion from ITU-R BT.2020 standard representation to ITU-R BT.709 standard representation;
- a possible step of application of an Opto-Electrical Transfer Function (or OETF).

In the present example, the component values $r''_{p'}$, $g''_{p'}$, $b''_{p'}$, are three colour components $r'_{p'}$, $g'_{p'}$, $b'_{p'}$ for each pixel p' of the output image $I'_{sdr}$ (namely a red component $r'_{p'}$, a green component $g'_{p'}$ and a blue component $b'_{p'}$). Another representation may however be used for the output image $I'_{sdr}$, such as for instance using a luminance component $y'_{p'}$ (possibly equal in this case to the output luminance value $L'_{sdr}$ produced by the mapping unit 30 for the concerned pixel p') and two chrominance components $u'_{p'}$, $v'_{p'}$ for each pixel p'.

The image processing device 21 includes an output module 28 for outputting the component values $r'_{p'}$, $g'_{p'}$, $b'_{p'}$, for instance for use by a display module of the electronic device mentioned above to display the output image $I'_{sdr}$ on a screen of this electronic device, or, as a variation, for transmission to an external electronic circuit of the electronic device (using a communication circuit of the electronic device).

FIG. 6 shows a possible embodiment of the mapping unit 30.

This mapping unit 30 includes a peak luminance provision module 31, an exponent determination module 32, an adaptive mapping module 34 and a static mapping module 36.

The peak luminance provision module 31 is configured to receive (as an input for the mapping unit 30) the peak luminance $Y_{peak}$. The peak luminance $Y_{peak}$ is for instance selected by a user of the image processing device 21. The peak luminance $Y_{peak}$ may be entered by the user via a user interface of the above-mentioned electronic device, for instance; the user interface then transmits the entered peak luminance $Y_{peak}$ to the mapping unit 30 (via the peak luminance provision module 31). According to another possibility, the peak luminance $Y_{peak}$ may be stored in a storage unit of the image processing device 21; the peak luminance provision module 31 may then read the peak luminance $Y_{peak}$ from the storage unit. According to yet another possibility, the peak luminance $Y_{peak}$ may be received as metadata associated with the input image $I'_{hdr}$, the peak luminance provision module 31 may then obtain the peak luminance $Y_{peak}$ by parsing these metadata.

When it is sought to obtain a roundtrip of an image previously processed by the image processing device 1 described with reference to FIG. 1, the same peak luminance $Y_{peak}$ should be used in both image processing devices 1, 21.

The exponent determination module 32 is configured to determine an exponent $\gamma$ based on input luminance values $L'_{hdr}$ (produced by the image preparation module 24 for the current input image $I'_{hdr}$) and on the peak luminance $Y_{peak}$.

In the present example, the exponent determination module 32 is configured to determine the exponent as a function of a measure of central tendency (here the median) of the input luminance values $L'_{hdr}$. Here, it is further provided that the measure of central tendency is scaled down depending on the peak luminance $Y_{peak}$ and possibly corrected to be at least equal to a minimal value $L_0$.

Thus, in the example presently described, the exponent determination module 32 is configured to compute the scaled-down and corrected measure of central tendency $L_{med}$ as follows:

$$L_{med} = \max\left(\text{median}(L'_{hdr}) * \left(\frac{Y_{peak}}{Y_{max}}\right), L_0\right)$$

where $Y_{max}$ is the maximum possible value for $Y_{peak}$, as explained above.

The exponent determination module 32 is furthermore configured to determine the exponent $\gamma$ as a function of the (here scaled-down and corrected) measure of central tendency and of the peak luminance $Y_{peak}$.

In the example presently described, the exponent determination module 32 is configured to compute the exponent $\gamma$ as follows:

$$\gamma = \frac{1}{g * \log_{10}(L_{med}) + o} + \delta$$

$$\text{with } \delta = 1 - \left(\frac{Y_{max}}{Y_{peak}}\right)^{0.13},$$

g a gain parameter (e.g. g=0.06), o an offset (e.g. o=1).

Thus, in the present example, the exponent is the sum of a first term and a second term $\delta$, where the first term decreases as a function of the (here scaled-down and corrected) measure of central tendency of luminance of the input image $I'_{hdr}$ and/or the second term $\delta$ increases as a function of the peak luminance $Y_{peak}$. It may be noted that, here, the first term does not vary as a function of the peak luminance $Y_{peak}$ and/or the second term $\delta$ does not vary as a function of the measure of central tendency. In the present case, the second term $\delta$ is a non-positive number and/or is equal to zero when the peak luminance $Y_{peak}$ equals the maximum luminance $Y_{max}$.

The adaptive mapping module 34 is configured to determine (for each pixel p of the processed image) an intermediate luminance value $L_m$ based on the input luminance value $L'_{hdr}$ and on the exponent $\gamma$ (produced by the exponent determination module 32).

Precisely, the adaptive mapping module 34 is here adapted to obtain the intermediate luminance value $L_m$ by exponentiating the input luminance value $L'_{hdr}$ with the inverse of the exponent $\gamma$ (produced by the exponent determination module 32):

$$L_m = (L'_{hdr})^{\frac{1}{\gamma}}$$

The static mapping module 36 is configured to determine (for each pixel of the processed image) the output luminance value $L'_{sdr}$ (relating to the corresponding pixel in the output image $I'_{sdr}$) based on the intermediate luminance value $L_m$ (produced by the adaptive mapping module 34 as just mentioned) and the peak luminance $Y_{peak}$, as well as here based on the exponent $\gamma$.

In the example described, the static mapping module 36 is configured to compute the output luminance value $L'_{sdr}$ as follows:

$$L'_{sdr} = \left( \frac{m_a * L_m}{\left(\frac{Y_{peak}}{Y_{max}}\right)^{\frac{1}{\gamma}} * (m_a - 1) + L_m} \right)^{m_c}$$

where $m_a$=1.528 and $m_c$=0.7997 in the present example, as in the image processing device 1 shown in FIG. 1.

Thus, for an input luminance value $L'_{hdr}$ equal to the supremum $y_1$ (and corresponding here to the ratio between the adjustable peak luminance $Y_{peak}$ and the maximum luminance $Y_{max}$), the mapping unit 30 produces an output luminance value $L'_{sdr}$ equal to 1 (i.e. equal to the highest value $x_1$ in the second range of values $[x_0, x_1]$), whatever the peak luminance $Y_{peak}$ used.

The invention claimed is:
1. An image processing device for converting an input image having a first dynamic range into an output image having a second dynamic range higher than the first dynamic range, the image processing device comprising:
  at least one processor configured to transform an input luminance value associated with a pixel of the input image into an output luminance value associated with the corresponding pixel in the output image,
  wherein the at least one processor is configured to apply a continuous and increasing function mapping a first range of values into a second range of values, whereby the highest value in the first range of values is mapped by the continuous and increasing function into a supremum of the second range of values,
  wherein the at least one processor is configured to determine a peak luminance as a function of a plurality of pixel values of the input image by evaluating a measure of brightness of the input image and determining the peak luminance as a function of said measure of brightness, the peak luminance decreasing as a function of said measure of brightness, and
  wherein the at least one processor is configured to adjust the supremum depending on the peak luminance.
2. The image processing device according to claim 1, wherein the at least one processor is configured to vary at least one parameter $\gamma$ of the continuous and increasing function depending on the peak luminance.
3. The image processing device according to claim 1, wherein the at least one processor is configured to determine an exponent $\gamma$ based on the peak luminance and exponentiate using said exponent $\gamma$.
4. The image processing device according to claim 3, wherein the at least one processor is configured to cause the exponent $\gamma$ to increase as a function of the peak luminance.
5. The image processing device according to claim 1, wherein the at least one processor is configured to transform the input luminance value into an intermediate luminance value by applying a mapping function depending upon the peak luminance.
6. A method for converting an input image having a first dynamic range into an output image having a second dynamic range higher than the first dynamic range, the method comprising:
  determining a peak luminance as a function of a plurality of pixel values of the input image by evaluating a measure of brightness of the input image and determining the peak luminance as a function of said measure of brightness, the peak luminance decreasing as a function of said measure of brightness;
  transforming an input luminance value associated with a pixel of the input image into an output luminance value associated with the corresponding pixel in the output image by applying a continuous and increasing function mapping a first range of values into a second range of values, whereby the highest value in the first range of values is mapped by the continuous and increasing function into a supremum of the second range of values, the supremum being adjustable depending on the peak luminance.
7. The method according to claim 6, wherein a parameter $\gamma$ of the continuous and increasing function is variable depending on the peak luminance.

* * * * *